United States Patent
Coolidge

(10) Patent No.: US 6,440,315 B1
(45) Date of Patent: Aug. 27, 2002

(54) PROCESS AND APPARATUS FOR FILTERING, AND FOR REDUCING ALGAE FORMATION OR KILLING ALGAE IN FISH TANKS, AND THE LIKE

(76) Inventor: David L. Coolidge, 118 Industrial Way, Unit "A", Corona, CA (US) 91720

( * ) Notice: Subject to any disclaimer, the term of this patent is extended or adjusted under 35 U.S.C. 154(b) by 0 days.

(21) Appl. No.: 09/790,407

(22) Filed: Mar. 29, 2001

(51) Int. Cl.⁷ .................................................. C02F 1/50

(52) U.S. Cl. ........................ 210/764; 210/765; 210/169; 210/194; 210/416.2

(58) Field of Search ................................ 210/764, 765, 210/169, 194, 416.2

(56) References Cited

U.S. PATENT DOCUMENTS

| | | | | |
|---|---|---|---|---|
| 3,865,728 A | * | 2/1975 | Abbott et al. | |
| 3,969,248 A | * | 7/1976 | Whitmer | |
| 5,008,011 A | * | 4/1991 | Underwood | |
| 5,279,748 A | * | 1/1994 | Hackett | |
| 6,287,450 B1 | * | 9/2001 | Hradil | |

* cited by examiner

*Primary Examiner*—Betsey Morrison Hoey
(74) *Attorney, Agent, or Firm*—Willie Krawitz

(57) ABSTRACT

A finely divided mesh cloth of bronze, brass, and/or copper is employed in the water circulation system of a fish tank and thereby prevent/inhibit/remove algae formation or outright kill these types of organisms, besides functioning as a filter. The process and apparatus may also be used in hot tub spas, water ponds or slews, etc.

26 Claims, No Drawings

PROCESS AND APPARATUS FOR FILTERING, AND FOR REDUCING ALGAE FORMATION OR KILLING ALGAE IN FISH TANKS, AND THE LIKE

BACKGROUND OF THE INVENTION

This invention relates to a new and improved process and apparatus for removing or killing algae in fish tanks, and may also have similar use in hot tub spas, water ponds, slews, cooling towers, and the like, besides functioning as a filter in these environments. The process and apparatus of this invention are particularly suited to continuous recycle filtering, and for neutralizing algae in fish tanks of fairly large size such as fifty gallons of water and which are useful for holding ornamental or other types of fish.

Typical publications concerning water purification as it affects the removal of algae are found in U.S. Pat. No. 3,865,728; 4,056,474; 4,257,352; 5,232,582; 5,749,181; 5,788,858; 5,849,284; and, 5,879,565. However, none of these patents disclose an effective, inexpensive and simple system for neutralizing algae in a fish tank and for simultaneously filtering water therein.

For example, U.S. Pat. No. 5,788,858 discloses the use of brass in a reticulated form to dechlorinate water having a high degree of chlorination, which may be obtained from an emergency source such as a swimming pool. Not only does the patent state that the dechlorination process causes the brass to decompose into copper oxide and zinc chloride, but this type of water source is too highly chlorinated for use in a fish tank.

THE INVENTION

According to the invention, there is provided a process and apparatus for neutralizing or killing algae in a fish tank, comprising continuously or intermittently filtering the water in a fish tank while passing the fish tank water through a fine wire mesh or cloth of bronze, brass, copper, or blends thereof. Typically, the wire mesh forms part of the filter associated with a water pump which continuously or intermittently recirculates water for the fish tank. It is believed that similar placement of the wire mesh cloth in a recirculating pump for a water pond, slew or similar body of water will either kill and/or significantly reduce the formation of algae therein.

In general, the algicidal amounts of copper required in the wire mesh or cloth may be about 60%–100%, and in the case of bronze mesh cloth, about: 70%–90% copper, and 30%–10% of tin may be employed in the alloy, all parts by weight. As indicated, supra, a mesh of essentially copper cloth may be suitable for purposes of filtering and algae removal. A cloth mesh size in the order of about 100 mesh is suitable for algae removal and filtering requirements of this invention.

Typical brass alloy mesh cloths may comprise about 60%–90% copper and about 10%–40% zinc; minor amounts of about 1%–4% aluminum may also be used in the alloy. Another type of alloy brass mesh cloth may include about: 61% copper, 38% zinc, and 1% tin, all parts by weight.

It is believed that contact of the algae with the bronze, or equivalent brass mesh, and possibly copper cloth impairs, interrupts or inhibits the reproductive system of the algae. In general, since there is only a very small amount of algae in the fresh water when the water is initially added to the tank, continual contact of the algae with the wire mesh will effectively remove and/or prevent algae formation.

The chlorination level in the fish tank is sufficiently low so that it does not present a toxic threat to the fish, and this low chlorination usage level also determines that decomposition of the brass, bronze or copper meshes will not occur, unlike the dechlorination reaction described in U.S. Pat. No. 5,788,858; hence, replacement of the mesh is not required.

Typically, contact of the fish tank water with the mesh types of this invention will remove or prevent algae formation for a period of about at least three (3) months, even in hard water, and without special algae removal procedures being required. As an example, for a fish tank of twenty (20) gallons capacity, use of a bronze mesh weight of only 1–2 ounces appears adequate to obtain the desired results for filtering, and algae prevention or removal. It has been found that filtering and treatment of the fish tank water is effective for at least three (3) months.

What is claimed is:

1. A method for reducing, preventing or removing algae from fish tank water containing fish, comprising filtering the fish tank water with a metallic mesh or cloth selected from the group consisting of bronze alloy, brass alloy, or copper and blends thereof, the fish tank water having a sufficiently low chlorine content without posing injury to the fish, and without the mesh or cloth undergoing chemical degradation by the chlorine, the method also being effective in hard water.

2. The method of claim 1, in which the metallic mesh or cloth contains about 60%–100% by weight of copper.

3. The method of claim 1, in which the metallic mesh or cloth comprises a brass alloy of about 60%–90% by weight of copper, and about 10%–40% by weight of zinc.

4. The method of claim 3, in which the metallic mesh or cloth comprises a brass alloy of about 1%–4% by weight of aluminum.

5. The method of claim 1, in which the metallic mesh or cloth comprises a bronze alloy of about 70%–90% by weight of copper, and about 30%–10% by weight of tin.

6. The method of claim 1, in which the fish tank has a capacity of at least about 20–50 gallons.

7. The method of claim 1, in which the fish tank capacity is at least about 20–50 gallons, and the mesh or cloth weight is about 1–2 ounces.

8. The method of claim 1, in which the mesh or cloth size is in the order of about 100 mesh.

9. The method of claim 1, in which algae prevention or removal is effective over a period of at least three months.

10. The method of claim 1, in which the fish tank has a capacity of at least about 20–30 gallons, the mesh or cloth weight is about 1–2 ounces, and algae prevention is effective for at least three months.

11. The method of claim 1, in which the mesh or cloth size is in the order of about 100 mesh, the fish tank capacity is at least about 20–50 gallons, the mesh or cloth weight is about 1–2 ounces, and algae prevention is effective for at least three months.

12. The method of claim 1, in which the mesh or cloth forms part of a filter associated with a recirculating water pump.

13. The method of claim 1, in which the water is continuously or intermittently recirculated, the fish tank capacity is at least about 20–50 gallons, the mesh or cloth weight is about 1–2 ounces, and algae prevention is effective for at least three months.

14. The method of claim 1, in which the water is continuously or intermittently recirculated, the fish tank capacity is at least about 20–50 gallons, the mesh or cloth size is in the order of about 100 mesh, the mesh or cloth weight is about 1–2 ounces, the mesh or cloth forms part of a filter associated with a water recirculating pump, and algae prevention is effective for at least three months.

15. A method for reducing, preventing or removing algae from water contained in hot tub spas, slews, water ponds and cooling towers, comprising filtering the water therein with a metallic mesh or cloth selected from the group consisting of bronze alloy, brass alloy, or copper and blends thereof, the water having a sufficiently low chlorine content to avoid chemical degradation of the mesh or cloth by the chlorine, the method also being effective in hard water.

16. The method of claim 15, in which the metallic mesh or cloth contains about 60%–100% by weight of copper.

17. The method of claim 15, in which the metallic mesh or cloth comprises a brass alloy of about 60%–90% by weight of copper, and about 10%–40% by weight of zinc.

18. The method of claim 17, in which the metallic mesh or cloth comprises a brass alloy of about 1%–4% by weight of aluminum.

19. The method of claim 15, in which the metallic mesh or cloth comprises a bronze alloy of about 70%–90% by weight of copper, and about 30%–10% by weight of tin.

20. The method of claim 15, in which the mesh or cloth size is in the order of about 100 mesh.

21. The method of claim 15, in which the water is recirculated continuously or intermittently.

22. The method of claim 15, in which the mesh or cloth forms part of a filter associated with a water recirculating pump.

23. A filter for an aquarium, consisting essentially of a metallic mesh or cloth selected from the group consisting of algicidal amounts of bronze alloy, brass alloy, copper, and mixtures thereof.

24. The filter of claim 23, in which the metallic mesh or cloth contains about 60%–100% by weight of copper.

25. A filter for hot tub spas, slew, water ponds and cooling towers, consisting of a metallic mesh or cloth selected from the group consisting of algicidal amounts of bronze alloy, brass alloy, copper, and mixtures thereof.

26. The filter of claim 25, in which the metallic mesh or cloth contains about 60%–100% by weight of copper.

* * * * *